'5-122

1/18/35 X3 RE 32,291

United States Patent [19]

Nakagome et al.

[11] E Patent Number: Re. 32,291

[45] Reissued Date of Patent: Nov. 18, 1986

[54] SYSTEM FOR CODING INFORMATION CHANGE PICTURE ELEMENTS IN FACSIMILE SIGNAL

[75] Inventors: Yukio Nakagome, Yokohama; Hiroichi Teramura, Tokyo; Yasuhiro Yamasaki, Machida; Yasushi Wakahara, Tokyo, all of Japan

[73] Assignee: Kokusai Denshin Denwa Kabushiki Kaisha, Tokyo, Japan

[21] Appl. No.: 62,984

[22] Filed: Aug. 2, 1979

Related U.S. Patent Documents

Reissue of:

[64] Patent No.: 4,040,093
Issued: Aug. 2, 1977
Appl. No.: 6,11,,269
Filed: Sep. 8, 1975

[30] Foreign Application Priority Data

Sep. 9, 1974 [JP] Japan ..... 49-103004

[51] Int. Cl.[4] ..... H04N 1/415; H04N 1/417

[52] U.S. Cl. ..... 358/261; 375/122

[58] Field of Search ..... 358/261, 260; 340/347 DD; 364/515; 375/122

[56] References Cited

U.S. PATENT DOCUMENTS

| | | | |
|---|---|---|---|
| 3,813,485 | 5/1974 | Arps | 358/261 |
| 3,825,832 | 7/1974 | Frei | 358/135 |
| 3,830,965 | 8/1974 | Beaudette | 358/261 |
| 3,927,251 | 12/1975 | White | 358/261 |
| 3,937,871 | 2/1976 | Robinson | 358/260 |
| 3,950,609 | 4/1976 | Tanaka | 358/260 |
| 3,956,580 | 5/1976 | Murayama | 358/260 |

OTHER PUBLICATIONS

An article by H. E. White, M. D. Lippman, and K. H. Powers entitled, "Dictionary Look-Up Encoding of Graphic Data", p. 267, of the book, Picture Bandwidth Compression", edited by T. S. Huang and O. J. Tretiak, Gordon and Breach Science Publishers, New York 1972.

An article by I. Gorog, P. M. Heyman, H. K. Kim and M. D. Lippman, entitled, "An Experimental Low-Cost Graphic Information Distribution System Terminal", published on p. 14 of the 1971 Society for Information Display (SID), International Symposium Digest of Technical Papers, vol. 2, p. 14, (May 4th, 5th and 6th, 1971).

*Primary Examiner*—Howard Britton
*Attorney, Agent, or Firm*—Robert E. Burns; Emmanuel J. Lobato; Bruce L. Adams

[57] ABSTRACT

A system for coding information change picture elements in a facsimile signal, which is employed for coding the address of each information change picture element assuming information different from that of an immediately preceding picture element on each scanning line. A distance between the information change picture element and a final reference information change picture element selected from the information change picture elements of an immediately preceding scanning line and, if necessary, said scanning line is encoded in a manner to minimize the number of bits of each code word.

6 Claims, 17 Drawing Figures

SYSTEM FOR CODING INFORMATION CHANGE PICTURE ELEMENTS IN FACSIMILE SIGNAL

Matter enclosed in heavy brackets [ ] appears in the original patent but forms no part of this reissue specification; matter printed in italics indicates the additions made by reissue.

FIELD OF THE INVENTION

This invention relates to a coding system employed for efficient transmission or storage of a facsimile signal.

BRIEF DESCRIPTION OF THE PRIOR ART

Conventional coding method of the type are (1) a runlength coding method, in which signals of every scanning line are converted into a time-serial signal and then run lengths of successive white picture elements and of successive black picture elements are encoded in sequence and transmitted, and (2) a system, in which signals of a plurality of scanning lines are subjected to batch processing and then encoded and transmitted. In the method (1), however, the address of a picture element whose information has changed from white to black or vice versa (which picture element will hereinafter be referred to as the information change picture element) with respect to the state of an immediately preceding picture element, is encoded by the use of a distance between this picture element and an immediately preceding information change picture element on the same scanning line, but this system (1) does not ever utilize such property that a picture signal has close correlation in a vertical direction, and hence is not sufficient in its band compression effect. The method (2) is more excellent in the band compression effect than the abovesaid method (1) but is defective in that it generally requires a large memory capacity and is inevitably complicated in construction.

BRIEF SUMMARY OF THE INVENTION

An object of this invention [if] *is* to provide a system for encoding the address of an information change picture element of a facsimile signal which removes redundancy of the facsimile signal with a relatively small memory capacity and a simple device to enable marked reduction of a required transmission band with respect to the bandtime integral.

This invention is based of the following principles. Namely, in order to encode the address of an information change picture element of a facsimile signal, an information change picture element, which is considered to have the closest correlation to the information change picture element to be encoded (also including picture elements at both ends of the scanning line), is selected from the information change picture elements of the scanning line including the information change picture element to be encoded (which scanning line will hereinafter be referred to as the encoding scanning line) and a scanning line immediately preceding the abovesaid scanning line (which scanning line will hereinafter be referred to as the reference scanning line), so that a distance between the information change picture element to be encoded and the selected information change picture element is encoded.

BRIEF DESCRIPTION OF THE DRAWINGS

The principle, objects and operation of this invention will be clearly understood from the following detailed description taken in conjunction with the accompanying drawings, in which.

DETAILED DESCRIPTION OF THE INVENTION

Figure 1:
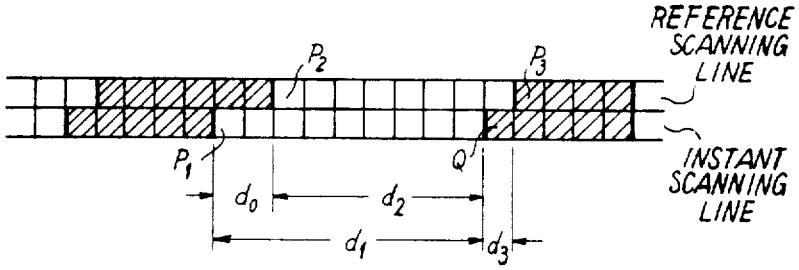
FIG. 1 is a diagram explanatory of the encoding principle of this invention.

With reference to FIG. 1, an example of coding according to this invention will first be described. Hatched picture elements represent black ones and non-hatched picture elements represent white ones. Since those picture elements which have information different from that of picture elements immediately preceding them are referred as information change picture elements as mentioned above, picture elements Q, $P_1$, $P_2$ and $P_3$ are information change picture elements. Now, let it be assumed that the address of the picture element Q is to be encoded. With the system of this invention, the address of the information change picture element Q is encoded by the use of any one of a distance $d_1$ of the abovesaid information change picture element Q from the immediately preceding information change picture element $P_1$ of the scanning line (the encoding scanning line) including the former Q and by the use of distances $d_2$ and $d_3$ of the abovesaid information change picture element to be encoded from the two successive information change picture elements $P_2$, $P_3$ of the immediately preceding scanning line (the reference scanning line) which are positioned at the right side of the information change picture element $P_1$ with respect to a column including the element $P_1$ in FIG. 1. The information change picture elements $P_1$, $P_2$ and $P_3$ will be referred to as the reference information change picture elements. The determination of which one of the distances $d_1$, $d_2$ and $d_3$ is used, that is, which one of the reference information picture elements $P_1$, $P_2$ and $P_3$ is selected as a final reference, is carried out in the following manner. Namely, in a case where the value of the distance $d_0$ between the information change picture elements $P_1$ and $P_2$ is smaller than a predetermined number L, the information change picture element $P_2$ is disregarded and either one of the information change picture elements $P_1$ and $P_3$ which is nearer to the information change picture element Q than the other is selected. If the value of the distance $d_0$ is larger than the abovesaid number L, the information change picture element $P_3$ is disregarded and either one of the information change picture elements $P_1$ and $P_2$ which is nearer to the information change picture element Q than the other is selected. The information change picture element thus selected will be referred to as the final reference information change picture element. Table 1 shows such selection principle of the standard information change picture element.

TABLE 1

| Condition | | Final Reference information change picture element |
|---|---|---|
| $d_0 \leqq L$ | $\lvert d_1 \rvert < \lvert d_3 \rvert$ | $P_1$ |
| | $\lvert d_1 \rvert \geqq \lvert d_3 \rvert$ | $P_3$ |
| $d_0 > L$ | $\lvert d_1 \rvert < \lvert d_2 \rvert$ | $P_1$ |
| | $\lvert d_1 \rvert \geqq \lvert d_2 \rvert$ | $P_2$ |

For example, if $L=3$, since the distance $d_0$ between the information change picture elements $P_1$ and $P_2$ is "2" and since the information change picture element $P_3$ is nearer to the information change picture element Q than the other in the present example, the final reference information change picture element is $P_3$ and, as the address of the information change picture element Q, the distance between it and the final reference information change picture element $P_3$, that is, $-1$, is encoded as follows:

[10110]

In the above example of coding, the first two bits indicate which one of the information change picture elements $P_1$, $P_2$ and $P_3$ is selected as the final information change picture element (for example, in a case of the picture element $P_1$, [00]; in a case of the picture element $P_2$, [01]; and in a case of the picture element $P_3$, [10]). A next one bit indicates whether the information change picture element Q is positioned at the right hand or the left hand of the picture element $P_2$ of $P_3$ in a case where the picture element $P_2$ or $P_3$ is selected as the final reference information change picture element (for example, the left side is indicated by [1] and the right side is indicated by [0]). The other remaining bits indicate the absolute value of the distance between the information change picture element to be encoded and the final reference information change picture element. For this coding, use is made of known variable-length coding as shown in Table 1.

Figure 2:
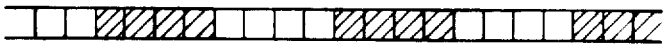
FIG. 2 is a diagram illustrating an example of a predetermined information pattern on a reference scanning line.

In a case where an error is made in the information encoded by the system of this invention in the transmission line, for example, if an error is produced in a code word indicative of the address of the information change picture element Q shown in FIG. 1 so as to displace the above picture element Q by an amount corresponding to R's picture elements, and if the information change picture element Q in which the error has been made is selected as the final reference information change picture element in the coding of an information change picture element on the next scanning line, this new information change picture element is also displaced by the R's picture elements. In other words, if an error is produced in the transmission line, the error is propagated so long as the erroneous information change picture element is selected as the final reference information change picture element. To avoid the propagation of such an error, information of the reference scanning line used for coding is set in such a predetermined setting reference scanning line information pattern as shown in FIG. 2 at intervals of a predetermined number N of scanning lines. By setting the reference scanning line information in the predetermined pattern for N's scanning lines, the propagation of error is suppressed with N's scanning lines at the maximum.

Further, in order to detect an error in the transmission line, error detecting bits are added to the information of every scanning line. The additional bits are indicative of the number of, for example, "1", included in the encoded scanning line information and, in a case of an overflow, it indicates only the digits of lower order.

The error detecting bits need not always be added to the information of each scanning line but may also be added to every N's scanning lines, to which the information of the reference scanning line is set in the predetermined pattern, as previously described.

Figure 3A:
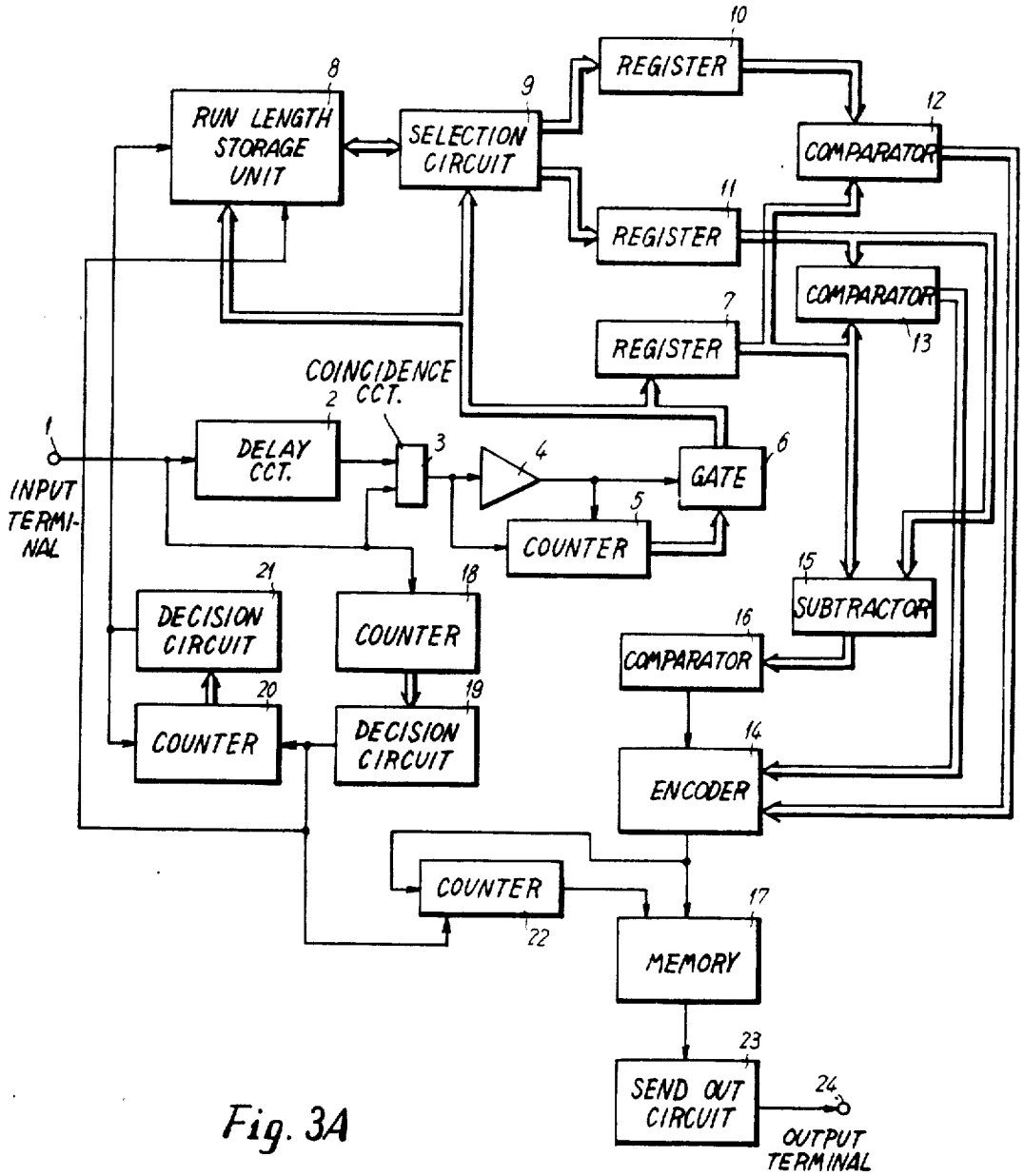
FIG. 3A is a block diagram illustrating an embodiment of this invention.

With reference to FIG. 3A, one example of this invention will now be described. Reference numeral 1 indicates an input terminal for a scanned facsimile signal; 2 designates a 1-bit delay circuit; 3 identifies a coincidence circuit for generating an output pulse when its two inputs coincide with each other; 5 a counter which counts output pulses of the coincidence circuit 3 and is restored to zero by an output pulse from a NOT circuit 4; 6 shows a gate which sends out the output from the counter circuit 5 in response to the output pulse from the NOT circuit 4; and 7 refers to a register which is composed, for example, of flip-flop circuits and stores therein the output state of the counter 5, that is, the distance (corresponding to $d_1$ in FIG. 1) between the information change picture element to be encoded (corresponding to Q in FIG. 1) and the information change picture element immediately preceding it (corresponding to $P_1$ in FIG. 1). Reference numeral 8 indicates a run-length storage unit which stores the run-lengths of the information change picture elements of the present coding scanning line and the preceding scanning line (the reference scanning line) relative to the information change picture elements immediately preceding them. Reference numeral 9 designates a selection circuit, which is formed with a simple logic circuit such, for example, as a subtract circuit, and which selects the reference information change picture elements $P_2$ and $P_3$ for the information change picture element Q from the run-length storage unit 8 and calculates and sends out the distances $d_2$ and $d_3$ between the reference information change picture elements $P_2$ and $P_3$ and the information change picture element Q. Reference numerals 10 and 11 denotes registers which are similar to the register 7 and store the values of the distances $d_3$ and $d_2$ calculated by the selection circuit 9, respectively. Reference numerals 12 and 13 identify comparators which respectively compare the absolute values of the contents of the registers 10 and 7, 11 and 7 with each other to decide which one of them is smaller than the other so as to derive therefrom the decided results and the smaller values. Reference numeral 14 represents an encoder for selectively rendering the output of the comparator 12 or 13 into a subtractor 15 for subtracting the contents of the register 11 from those of the register 7; 16 refers to a comparator for comparing the output from the subtractor circuit 15 with a predetermined value L to apply the result of the comparison operation to the encoder 14; 17 indicates a memory for storing therein the result encoded by the encoder 14; 18 designates a counter for counting the number of picture elements of a scanned facsimile signal; 19 identifies a decision circuit for deciding termination of each scanning line by the use of the output state of the counter 18; 20 denotes a counter for counting the number of scanning lines; 21 represents a decision circuit for finding out by the use of the output from the counter circuit 20 the scanning line to which the reference scanning line information is set in the predetermined pattern (depicted in FIG. 2); 22 shows a counter for counting the number of "1" in the information encoded by the encoder 14; 23 refers to a send-out circuit for sending out at a constant speed the information stored in the memory 17; and 24 indicates an output terminal. In FIG. 3, double lines represent parallel transmission and single lines represent serial transmission.

The operation of the example shown in FIG. 3A will be described with reference to the example of the facsimile signal shown in FIG. 1. Assume that encoding of the information change picture element $P_1$ has now been completed and that the next information change picture element Q is to be encoded. The scanned facsimile signal is applied to the input terminal 1 and, since the same signal (white) continues from the picture element $P_1$ to that immediately preceding the picture element Q in FIG. 1, the output of the delay circuit 2 and that of the input terminal 1 are coincident with each other so that the coincidence circuit 3 generates output pulses. The pulses are counted by the counter 5 but, when the scanned facsimile signal becomes Q, the input signal state changes from white to black, so that the output of the delay circuit 2 and the input signal from the input terminal 1 differ from each other so that no output pulse is derived from the coincidence circuit 3. At this time, the NOT circuit 4 develops a pulse at its output to open the gate 6, through which the contents of the counter 5, that is, the distance $d_1(=9)$ between the information change picture elements $P_1$ and Q, is applied to the register 7 and the run-length storage unit 8 and, thereafter, the contents of the counter circuit 5 are cleared to zero by the output of the circuit 4. From the contents of the run-length storage unit 8 is derived by the selection circuit 9 the run-length information corresponding to the information change picture elements shown in FIG. 1 and the distances $d_2(=7)$ and $d_3(=-1)$ between them and the information change picture element Q are calculated and applied to the registers 11 and 10, respectively. As a result of these operations, the values of the distances $d_1$, $d_2$ and $d_3$ are stored in the registers 7, 11 and 10, respectively. Then, the absolute values of the contents ($d_3$) and ($d_1$) of the registers 10 and 7 and the absolute values of the contents ($d_2$) and ($d_1$) of the registers 11 and 7 are compared with each other in the comparators 12 and 13, respectively so that the decided information and the smaller absolute values are applied to the encoder 14. In the example shown in FIG. 1, $d_1=9$, $d_2=7$ and $d_3=-1$, so that the comparators 12 and 13 apply to the encoder 14 the information indicative of the information change picture element $P_3$ and the value $-1$ of the distance $d_3$ and the information indicative of the information change picture element $P_2$ and the value 7 of the distance $d_2$ as decided information, respectively. On the other hand, in the subtractor 15, the contents ($d_2$) of the register 11 are subtracted from the contents ($d_1$) of the register 7 while, in the comparator 16, the result of the calculation $d_0(d_2-d_1=2)$ and the predetermined number L are compared with each other. The results of these comparison operations are applied to the encoder 14. The encoder 14 receives the information from the comparators 12, 13 and 16 and renders the address of the information change picture element Q into a variable length code word in accordance with the encoding principle shown in Table 1 and applies the code word to the memory 17 and the counter 22. The counter 22 counts the number of "1" included in the encoded code word and, upon termination of each scanning line, applies the counted value to the memory 17 in response to a signal from the decision circuit 19 described later and is cleared to zero. On the other hand, the number of picture elements of the facsimile signal applied through the input terminal 1 is counted by the counter 18 and, in the decision circuit 19, it is decided that the facsimile signal has reached the end of each scanning line. At this time, in the counter 20, the number of encoded scanning lines is counted and when this number has reached the predetermined number N, this state is detected by the decision circuit 21 so that the contents of the counter 20 are cleared to zero and, at the same time, the information of the reference scanning line in the run-length storage unit 8 is set to the predetermined pattern as shown in FIG. 2. The send-out circuit 23 applies the contents of the memory 17 to the output terminal 24 at a constant speed.

Figure 3B:
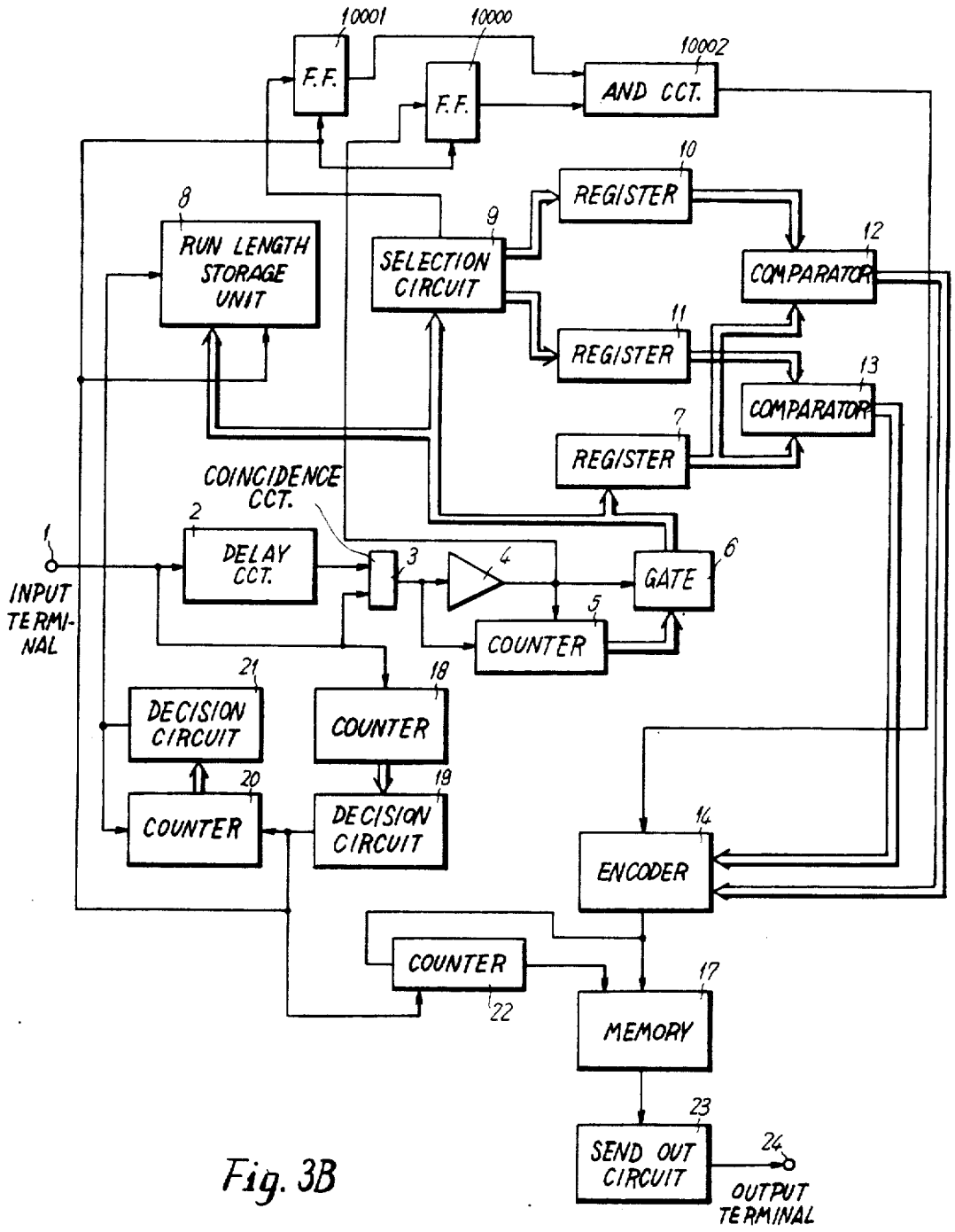
FIGS. 3B and 3C are block diagrams each illustrating a modification of the embodiment shown in FIG. 3A.
Figure 3C:
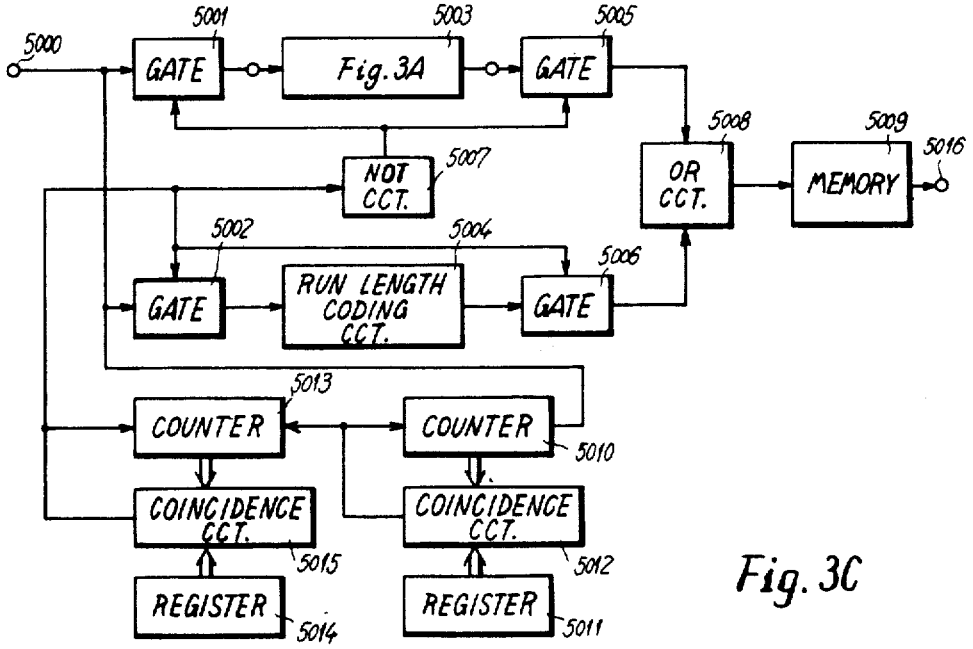

With reference to FIG. 3B, a modification of the embodiment shown in FIG. 3A will now be described. In FIG. 3B, the subtractor 15 and the comparator 16 are eliminated from the embodiment shown in FIG. 3A, while circuits 10000, 10001 and 10002 are added. A T-flip flip circuit 10000 is reset to the state "0" by the output of the decision circuit 19 and set by the output of the NOT circuit 4. A T-flip flop circuit 10001 is reset to the state by the output of the decision circuit 19 and set by the output from a terminal 911 described below with reference to FIG. 7B. An AND circuit 10002 produces an AND output for the outputs of the flip flop circuit 10000 and 10001 to apply the AND output to the encoder 14.

The operation of this example will be briefly described for only those parts different from the example shown in FIG. 3A. In this case, it is assumed that a first picture element is forcibly coded as a "white" picture element. In operation, the flip flop circuit 10000 is reset by the output of the decision circuit 19, so that this flip flop circuit 10000 assumes the state "0" at the start of each scanning line. Moreover, the state of the flip flop circuit 10000 is reversed at the termination of a run of the register 7 to be coded since the input of the flip flop circuit 10000 is the output of the NOT circuit 4, so that the state of the flip flop circuit 10000 assumes the states "1" and "0" in accordance with the even order number of the run (black) or the odd order number of the run (white) of the contents of the register 7, respectively. On the other hand, the flip flop circuit 10001 is reset to the state "0" at the start of each scanning line and receives an input pulse at the termination of each run on the reference scanning line as described below. Accordingly, the flip flop circuit 10001 assumes the states "1" and "0" in accordance with the even order number of the run (black) or the odd order number of the run (white) of the contents of the register 10. Accordingly, the output of the AND circuit 10002 assumes the state "1" when the runs in the registers 7 and 10 are both black or both white but the state "0" when one and the other of the runs in the registers 7 and 10 are black and white respectively. In a case where the output of the AND circuit 10002 assumes the state "1", the contents of the register 11 are abandoned at the encoder 14. If the output of the AND circuit 10002 assumes the state "0", the contents $d_3$ of the register 10 are abandoned at the encoder 14.

In order to prevent propagation of error, other systems may be adopted. Namely, a predetermined number (e.g. 4, 8, etc.) of scanning lines are processed by a known run length coding system with no use of a preceding scanning line as a reference, while other scanning lines are processed in accordance with the above mentioned coding principle. An embodiment of this invention shown in FIG. 3C applied for this purpose comprises an input terminal 5000 of a facsimile signal, gates 5001 and 5002, the coding circuit 5003 shown in FIG. 3A, a known run length coding circuit 5004, gates 5005 and 5006, a NOT circuit 5007, and OR circuit 5008, a memory 5009, a counter 5010 for counting the number of input pulses of the input terminal 5000, a register 5011 for storing the number of picture elements on one scanning line, a coincidence circuit 5012 for generating a pulse when two inputs thereof coincide with each other, a counter 5013 for counting the number of pulses generated from the coincidence circuit 5012, a register 5014 for storing a predetermined number such as four or eight etc., a coincidence circuit 5015, and an output terminal 5016.

In operation, the number of bits applied through the input terminal 5000 is counted at the counter 5010. Since the number of picture elements included in the scanning line is stored in the register 5011, the coincidence circuit 5012 generates a pulse at the termination of one scanning line. The output pulse of the coincidence circuit 5012 resets the counter 5010 to zero. Accordingly, the coincidence circuit 5012 generates a pulse at the termination of each scanning line. The output pulses of the coincidence circuit 5012 are counted by the counter 5013 to indicate the number of scanning lines. If the register 5014 stores number "4", the coincidence circuit 5015 generates a pulse for each fourth scanning line. Accordingly, at the 1st, 2nd, 3rd, 5th, 6th, 7th, 9th, 10th, 11th, 13th, . . . scanning lines, the state of the output of the coincidence circuit 5015 assumes the state "0" so that the angles 5001 and 5005 are opened while the gates 5002 and 5006 are closed. At the 4th, 8th, 12th, . . . scanning lines, the coincidence circuit 5015 assumes the output state "1" so that the gates 5002 and 5006 are opened while the gates 5001 and 5005 are closed. As a result of the above operation, the input signal of the input terminal 5000 is applied to the run length coding circuit 5004 for every four scanning lines, while the remainder of the input signal is applied to the coding circuit 5003 (FIG. 3A).

Figure 4:
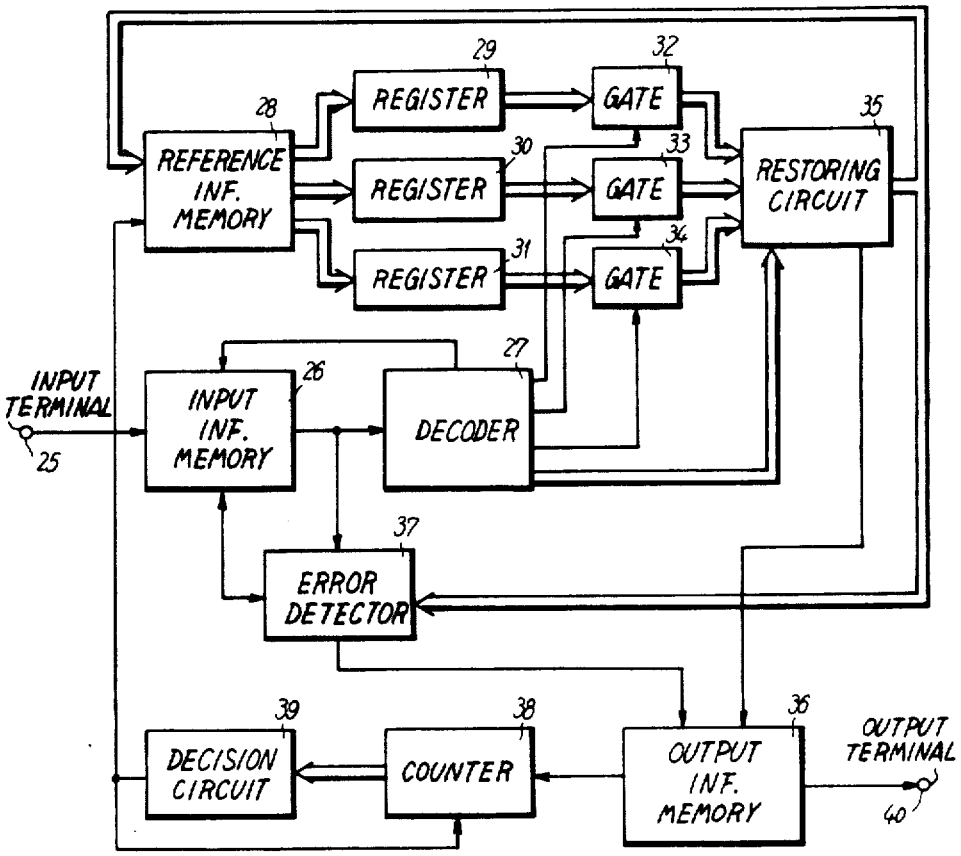
FIG. 4 is a block diagram illustrating an example of a circuit employed for reverse conversion of a coded signal produced in accordance with this invention.

Next, a description will be given of reverse conversion of the encoding achieved as described above. FIG. 4 is a block diagram showing an example of the reverse conversion. In FIG. 4, reference numeral 25 indicates an input terminal for the encoded facsimile signal; 26 designates an input information memory for temporarily storing the input signal; 27 denotes a decoder for decoding the variable length code word by deciding the final reference information change picture element from the signal read out from the memory; 28 identifies a reference information memory for storing the absolute address of the past information change picture element (the number of picture elements counted from the left-hand end of the scanning line); 29, 30 and 31 represent registers for storing the absolute addresses of the reference information change picture elements (corresponding to $P_1$, $P_2$ and $P_3$ in FIG. 1, respectively) employed for encoding; 32, 33 and 34 denote gates which permit the passage therethrough of only the information of that final reference information change picture element of the three reference information change picture elements which has been decided by the decoder 27; 35 shows a restoring circuit for restoring the facsimile signal by calculating the absolute address of the encoded information change picture element by the use of the absolute address information of the final reference information change picture element and the distance information decoded by the decoder 27; 36 refers to an output information memory for storing the facsimile signal obtained in the restoring circuit 25; 37 indicates an error detector for detecting an error in the input information by the use of the error detecting bits added to the information of each scanning line; 38 designates a counter for counting the number of the scanning lines of the restored facsimile signal; 39 denotes a decision circuit for deciding by the use of the contents of the counter 38 the scanning line to which the reference scanning line information is set in the predetermined pattern (for example, the pattern shown in FIG. 2); and 40 identifies an output terminal for the facsimile signal.

The circuit of FIG. 4 performs the following operation. The received facsimile signal is temporarily stored in the input information memory 26 through the input terminal 25. In the information thus stored, the information concerning the relative addresses of the information change picture elements is applied to the decoder 27 and decoded thereby. In the information thus decoded, one predetermined bit is applied from the input information memory 26 to the decoder 27 and the circuit 27, decodes it to obtain information indicative of whether one or more bit is required or not, and applies this information to the unit 26 and receives necessary information from the memory 26, thus completing decoding. Thereafter, the above operations are repeated. The information, on which one of the reference information change picture elements $P_1$, $P_2$ and $P_3$ shown in FIG. 1 has been selected as the final reference information change picture element, is applied to any one of the gates 32, 33 and 34 in accordance with the content of the information. The information of the distance relative to the final reference information change picture element is applied to the restoring circuit 35. In the example shown in FIG. 1, since the final reference information change picture element in $P_3$, the output pulse is applied only to the gate 34 while no output pulse is applied to the gates 32 and 33. On the other hand, the reference information memory 28 has stored therein the absolute addresses of past information change picture elements, from which the absolute address information of each of three reference information change picture elements ($P_1$, $P_2$ and $P_3$ in FIG. 1) necessary for restoration is picked up and then stored in each of the registers 29, 30 and 31. In the absolute address information of these three reference information change picture elements, only the information of the final reference information change picture element is applied to the restoring circuit 35 through the gate 32, 33 or 34. In the example shown in FIG. 1, since the picture element $P_3$ is the final reference information change picture element, only the gate 34 is opened, through which the absolute address information of the final reference information change picture element $P_3$ stored in the registor 31 is applied to the restoring circuit 35. In the restoring circuit 35, the encoded absolute address of the information change picture element is restored by the use of the absolute address information of the final reference information change picture element and the information of the distance from the final reference information change picture element obtained by the decoder circuit 37. The restored output is applied to the reference information memory 28, the output information memory 36 and the error detector 37. In accordance with the restored output, the reference information memory 28 determines the absolute address of the next reference information change picture element and then applies the determined absolute address to the registers 29, 30 and 31. The output information memory 36 stores therein the facsimile signal restored by the absolute address information of each information change picture element in the restoring circuit 35 and applies the restored signal to the output terminal at an appropriate speed. The error detector 37 detects the termination of each scanning line in accordance with the absolute address information of the information change picture elements supplied from the restoring circuit 35 and picks up from the input information memory 26 the error detecting bits added to the information of each scanning line to check them. If an error is detected, information indicative of the presence of the error is applied to the output information memory 36 and, in the output information memory 36 receiving the information, the information of the scanning line including the error is entirely rewritten into white. Further, the number of scanning lines of the restored facsimile signal is counted by the counter 38 and when the number of the scanning lines has reached the predetermined number N, the decision circuit 39 operates to clear the contents of the counter 38 to zero and apply information to the reference information memory 28, so as to set the information of the reference scanning line to the predetermined pattern.

The examples of FIGS. 3 and 4 are those based on the example of encoding shown in FIG. 1 and Table 1. In these examples, one reference scanning line is used and three picture elements $P_1$, $P_2$ and $P_3$ are used as the reference information change picture elements. However, it is also possible to increase the number of the reference scanning lines and increase or decrease the number of the reference information change picture elements.

In the foregoing, in accordance with the distance between picture elements, the presence or absence of correlation between them is determined and the information change picture element having closer correlation to the information change picture element to be encoded is selected. However, it is also possible to determine the presence or absence of correlation between the information change picture elements by taking the direction of an information change into consideration. Namely, in the example shown in FIG. 1, the direction of the information change of the picture element Q is from white to black and, in the information change picture elements $P_2$ and $P_3$, the picture element $P_3$ has the same direction of the information change as the picture element Q, so that the information change picture element Q is encoded on the base of nearer one to the element Q of the information change picture elements $P_3$ and $P_1$. However, if a distance $\overline{P}\,\overline{Q}$ is equal to a distance $\overline{P}\,\overline{Q}$, the element $P_1$ so employed as a reference.

Figure 5:
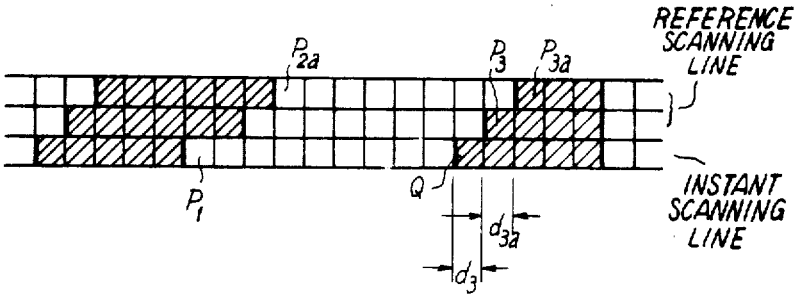
FIG. 5 is a diagram explanatory of other encoding principle of this invention.

Further, in the above system, predictive coding of the address of the information change picture element is also possible by the use of the information of a scanning line preceding, by more than two scanning lines, the information change picture elements to be encoded. FIG. 5 and Table 2 show an example of the predictive coding. Namely, in the present example, in order to encode the address of the information change picture element Q, the final reference information change picture element $P_3$ is selected by the principle described above so that then the distance $d_3$ between the information change picture elements Q and $P_3$ is predicted by the use of the coding information of the information change picture element $P_3$, that is, the information change picture element $P_3$ and the distance $d_{3a}$ of final reference information change picture element $P_{3a}$ relative to the abovesaid one $P_3$. In the example of the prediction shown in Table 2, only when the value of the distance $d_{3a}$ is $0\pm1$, prediction is carried out and when a predicted value $\bar{d}_3$ of the distance $d_3$ is equal to the value of the distance $d_{3a}$ and when the value of the distance $d_{3a}$ is $0\pm1$, the prediction is not achieved but the sign and the absolute value of the distance $d_3$ are encoded. In the event that the predicted value coincides with a practical, value, the abovesaid distance is encoded with one bit "0" and when they do not coincide with each other, the difference between $d_3$ and $\bar{d}$, that is, the sign and the absolute value of $d_3-\bar{d}_3$ are encoded after a flag "1" indicative of disagreement of the predicted value with the practical value.

TABLE 2

| $d_{3a}$ | Predicted value of $d_3$:$d_3$ |
|---|---|
| 0 | 0 |
| +1 | +1 |
| −1 | −1 |
| Others | No prediction is made. $d_3$ is encoded as it is. |
| Prediction right | 0 |
| Prediction wrong | indicative of the absolute value of the distance} |
| 1 + {sign} + {variable length code | |
| No prediction made | {sign} + {variable length code indicative of the absolute value of the distance} |

These methods can be practised with substantially the same circuits as those of the examples of FIGS. 3 and 4.

In the following, examples of circuits employed in the embodiments shown in FIGS. 3 and 4 will now be described.

Figure 6A:
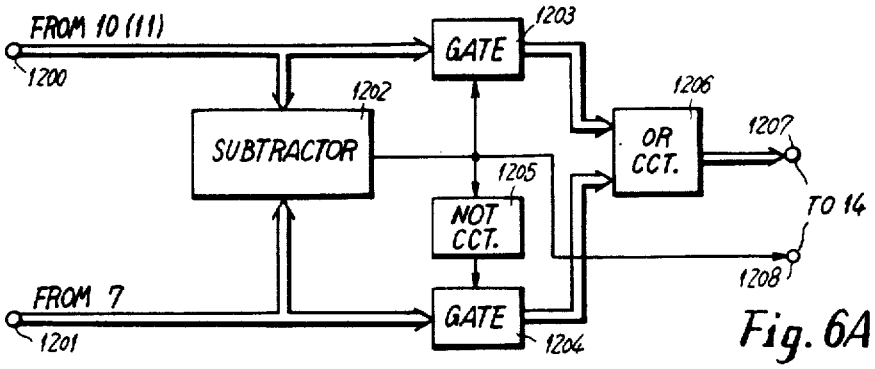
FIGS. 6A and 6B are block diagrams each illustrating an example of a comparator employed in this invention.

With reference to FIG. 6A, an example of the comparators 12 and 13 comprises an input terminal 1200 from the register 10 or 11, an input terminal 1201 from the register 7, a substractor 1202 for subtracting the contents through the terminal 1201 from the contents through the terminal 1200, gates 1203 and 1204, a NOT circuit 1205, an OR circuit 1206, an output terminal 1207 from the OR circuit 1206, and an output terminal 1208 from the subtractor 1202. In operation, the subtractor 1202 subtracts the absolute value of the contents through the input terminal 1201 from the absolute value of the contents through the input terminal 1200, so that an output is generated at the output terminal 1208 if the subtracted result assumes zero or a negative value. In this case, the gate 1203 is opened to pass the contents from the input terminal 1200 to the OR circuit 1206, while the gate circuit 1204 is opened to pass the contents from the input terminal 1201 when the subtractor 1202 does not generate its output in response to the positive value of the substracted result. Accordingly, either the contents from the input terminals 1200 and 1201 having a smaller absolute value is obtained at the output terminal 1207.

Figure 6B:
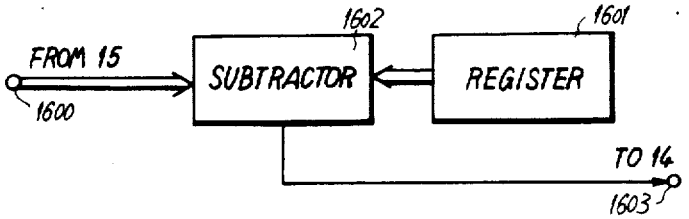

With reference to FIG. 6B, and example of the comparator 16 comprises an input terminal 1600 from the subtractor 15, a register 1601 for storing a predetermined number L, a substractor 1602 for subtracting the contents of the register 1601 from the contents from the input terminal 1600, and an output terminal 1603 for supplying the substracted result to the encoder 14. In operation, the contents ($d_0$ in FIG. 1) from the input terminal 1600 is subtracted at the subtractor 1602 by the predetermined number L, so that an output pulse is generated at the output terminal 1603 when the subtracted result assumes zero or a negative value.

Figure 7A:
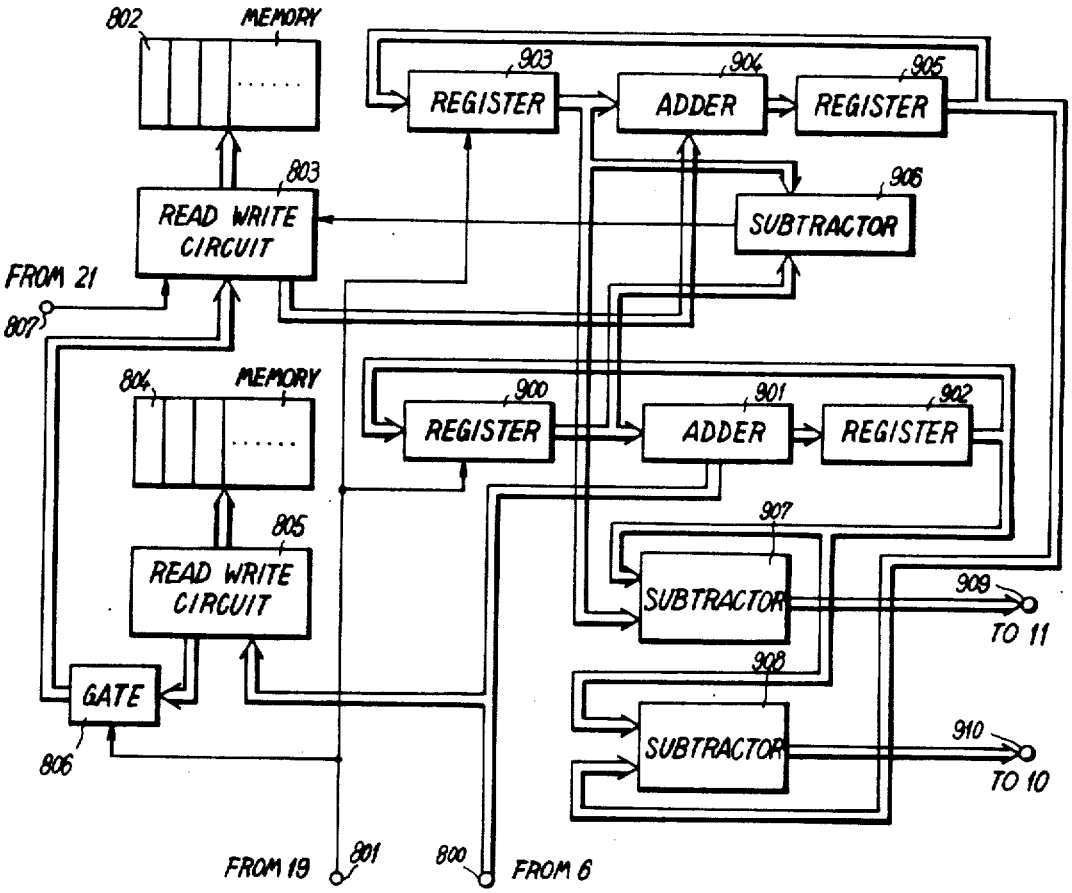
FIGS. 7A and 7B are block diagrams each illustrating an example of a combination of a run length memory and a selector employed in this invention.

With reference to FIG. 7A, an example of a cascade connection of the run-length storage unit 8 and the selection circuit 9 comprises an input terminal 800 for receiving run information from the gate 6, an input terminal 801 for receiving the output from the decision circuit 19, a memory 802 for successively storing the respective lengths of the respective scanning lines, a read-write circuit 803 for the memory 802, a memory 804 for successively storing the respective lengths of scanning lines to be coded, a read-write circuit 805 for the memory 804, a gate 806 for transferring the contents of the memory 804 to the memory 802 at the completion of coding the respective run length information in the memory 804, and an input terminal 807 for receiving the output of the decision circuit 21. Moreover, a register 900 stores the absolute address (the number of picture elements from the left end of each scanning line) of an information change picture element ($P_1$ in FIG. 1) immediately preceding an information change picture element (Q in FIG. 1) to be coded. An adder 901 adds the contents of the register 900 to the contents from the input terminal 800 to obtain the absolute address of the information change picture element (Q in FIG. 1) to be coded. A register 902 temporarily stores the absolute address of the information change picture element to be coded which is applied from the adder 901. A register 903 stores the absolute address of the reference information change picture element ($P_2$ in FIG. 1) of the reference scanning line. An adder 904 addes the contents of the register 903 to the run-length of the memory 802 to obtain the absolute address of a next information change picture element ($P_3$ in FIG. 1) immediately succeeding the information change picture element ($P_2$ in FIG. 1) in the register 903. A register 905 stores the output of the adder 904. Subtractor 906, 907 and 908 subtract the contents of the registers 900, 902 and 902 from the contents of the registers 903, 903 and 905, respectively. Output terminals 909 and 910 are respectively connected to the registers 11 and 10.

In operation, the run-length information of the scanning line to be coded is applied from the input terminal 800 and stored in the memory 802. When scanning of the scanning line to be coded is completed, the gate 806 is opened in response to the output pulse of the decision circuit 19 through the input terminal 801, so that the run-length information stored in the memory 804 is written in the memory 802 so as to become the run-information of the reference scanning line at the coding of the next scanning line. The register 900 is reset to zero in response to the output pulse from the input terminal 801 for the completion of each scanning line. The contents of the register 900 is added to the run-length from the input terminal 800 at the adder 901 to store the added result to the register 902. The contents of the register 902 are transferred to the register 900, so that the absolute address of an information change picture element $P_1$ immediately preceding the information change picture element Q from the terminal 800 is stored in the register 900 while the absolute address of the information change picture element Q is stored in the register 902. On the other hand, similar operations are repeated at the register 903, the adder 904, and the register 905 so that the absolute address of an information change picture element of the reference scanning line and the absolute address of a next information change picture element are stored in the registers 903 and 905, respectively. In this case, the subtractor 906 generates an output when the subtracted result of the contents (the absolute address of $P_1$) of the register 900 from the register 903 assumes a negative value, so that next run-length information is read out from the memory 802 and applied to the adder 904. The above operations are repeated as long as the output pulse is obtained from the subtractor 906. The above operation are terminated when the contents of the register 903 exceed the contents of the register 900, so that the respective absolute addresses of the reference information change picture elements $P_2$ and $P_3$ are finally stored in the registers 903 and 905, respectively. When the respective absolute addresses of the information change picture elements $P_1$, Q, $P_2$ and $P_3$ are stored in the registers 900, 902, 903 and 905, the absolute addresses of the picture element Q is subtracted from the absolute addresses of the picture elements $P_2$ and $P_3$ at the subtractors 907 and 908 to obtain the distances $d_2$ and $d_3$ in FIG. 1 and then to apply them to the output terminals 909 and 910, respectively. In this case, if a pulse is obtained at the input terminal 807, the contents of the memory 802 are set to predetermined contents while the reference scanning line information is set to a predetermined pattern to perform the above coding.

Figure 7B:
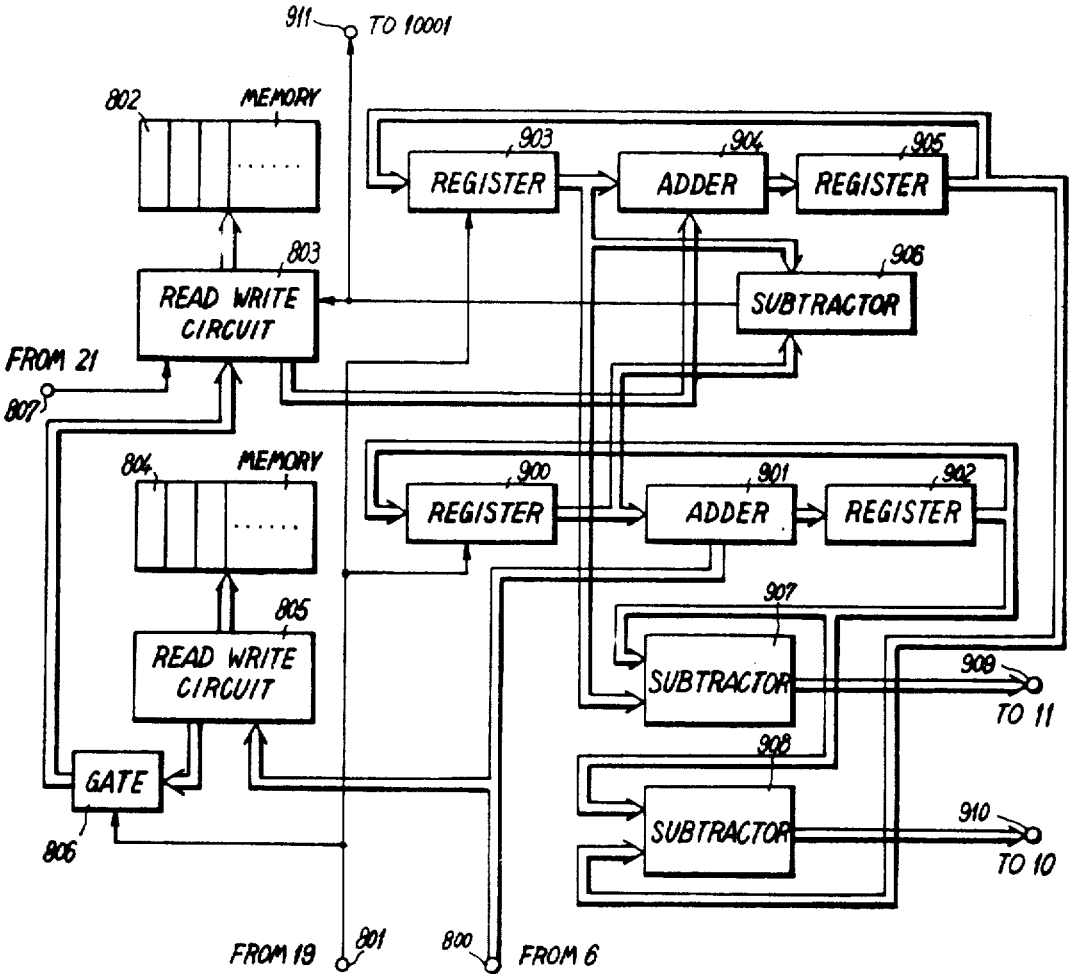

The circuits 8 and 9 shown in FIG. [7A] *3A* are modified as shown in FIG. 7B to be employed in the modified embodiment shown in FIG. 3B. In this modified circuit, an output terminal 911 is added and connected from the output of the subtractor 906 to the input of the flip flop circuit 10001. The output pulse of the subtractor 906 is employed as described above to read out the run information on the reference scanning line from the memory 802. In other words, an output pulse is applied to the flip flop circuit 10001 at each renewal instant of the run information of the registor 905.

Figure 8:
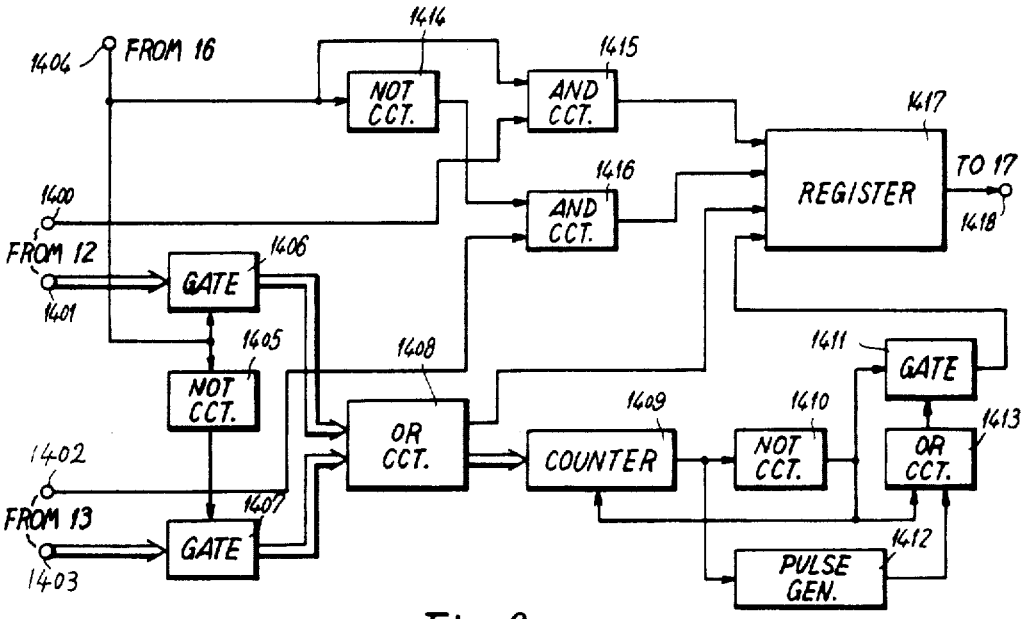
FIG. 8 is a block diagram illustrating an example of a coder employed in this invention.

With reference to FIG. 8, an example of the encoder 14 comprises input terminals 1400 and 1401 for receiving the outputs of the comparator 12, input terminals 1402 and 1403 for receiving the outputs of the comparator 13, an input terminal 1404 for receiving the output of the comparator 16, a NOT circuit 1405, gates 1406 and 1407, and an OR circuit 1408. Moreover, a counter 1409 is set to the output contents of the OR circuit 1408 and generates an output pulse when the contents thereof become zero. The output pulse of the counter 1409 is applied to a NOT circuit 1410, which generates output pulses in case of no pulse from the counter 1409, to reduce by one the contents of the counter 1409. The example further comprises a gate 1411, a pulse generator 1412 for generating one pulse in response to the state "1" of its input from the counter 1409, an OR circuit 1413, a NOT circuit 1414, AND circuits 1415 and 1416, a register 1417 for storing the outputs of the AND circuits 1415 and 1416, the OR circuit 1408 and the gate 1411, and an output terminal 1418.

In operation, a pulse is obtained at the input terminal 1404 as described with reference to FIG. 6B when the distance $d_0$ between the information change picture elements $P_1$ and $P_2$ is less than the predetermined number L, so that the gate 1406 is opened to apply the contents from the input terminal 1401 to the OR circuit 1408. In this case, the contents from the input terminal 1401 the indicate smaller one of the absolute values of the distances $d_1$ and $d_3$ shown in FIG. 1. However, in a case where the distance $d_0$ is larger than the number L, the gate 1407 is opened since no pulse is applied to the input terminal 1404, so that the contents from the input terminal 1403 indicative of the smaller one of the absolute values of the distances $d_1$ and $d_2$ are applied to the OR circuit 1408. The sign bit of the input contents of the OR circuit 1408 is applied to the register 1417, while the absolute value of the input contents of the OR circuit 1408 is applied to the counter 1409 to set the counting state thereof to the absolute value. The circuits 1409, 1410, 1411, 1412 and 1413 provide variable length code words shown in Table 3.

TABLE 3

| Length | Variable length code words |
|---|---|
| 0 | 0 |
| 1 | 10 |
| 2 | 110 |
| 3 | 1110 |
| 4 | 11110 |
| : | : |
| : | : |
| n | 11 . . . 110 |

The number of "1" of the variable length code words corresponds to the number indicative of the length. If zero is set to the counter 1409, a pulse is applied to the NOT circuit 1410 while the pulse generator 1412 generates one pulse. Since the gate 1411 is opened as a result of this operation, the output state "0" of the NOT circuit 1410 is applied to the register 1417 through the gate 1411. If one of other values other than zero is set to the counter 1409, these circuits operate as follows. The counter 1409 generates its output pulse only when the counting state therof becomes zero. The counting state of the counter 1409 is reduced by one in response to the output pulse of the NOT circuit 1410 when the counting state of the counter 1409 is not zero. As a result of this operation, a number of pulses corresponding to the value, which is set to the counter 1409, are obtained at the output of the NOT circuit 1410. In this case, since the gate 1411 is opened in response to the output pulses of the NOT circuit 1410 or the one pulse from the pulse generator 1412 when the counting state of the counter 1409 becomes zero, a pulse of state "0" and at least one pulse of state "1" corresponding to the set number in the counter 1409. As mentioned above, the variable length code words shown in Table 3 are obtained. The circuits 1414, 1415 and 1416 select a desired one of the distances $d_1$, $d_2$ and $d_3$ to apply the desired one to the register 1417 under conditions: which distances $d_1$ or $d_3$ has a smaller absolute value than the other, which distances $d_1$ or $d_2$ has a smaller absolute value than the other; and whether or not the distance $d_0$ is larger than the number L. In a case where the distance $d_0$ is equal or smaller than the number L, an output pulse is received from the input terminal 1404. In a case where the absolute value of the distance $d_1$ is equal or larger than the absolute value of the distance $d_3$, an output is received from the input terminal 1400. Accordingly, outputs of the AND circuits 1415 and 1416 assume the states "1" and "0" respectively. In a case where the absolute value of the distance $d_1$ is smaller than the absolute value of the distance $d_3$, outputs of the AND circuits 1416 and 1417 assume zero since no pulse is received from the input terminal 1400. If the distance $d_0$ is larger than the number L, no pulse is received from the input terminal 1404. In a case where the absolute value of the distance $d_1$ is equal or larger than the absolute value of the distance $d_2$, an output pulse is obtained from the input terminal 1402. Accordingly, outputs of the AND circuits 1415 and 1416 assumes the states "0" and "1" respectively. In a case where the absolute value of the distance $d_1$ is smaller than the absolute value of the distance $d_2$, the outputs of the AND circuit assume zero.

Figure 9:
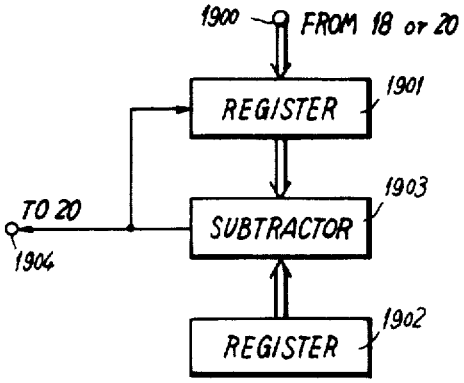
FIG. 9 is a block diagram illustrating an example of a decision circuit employed in this invention.

With reference to FIG. 9, an example of the decision circuit 19 and 21 comprises an input terminal 1900 from the counter 18 or 20, a register 1901 for temporarily storing the contents from the input terminal 1900, a register 1902 for storing a predetermined number, a subtractor 1903 for subtracting the contents of the register 1902 from the contents of the register 1901 to produce an output pulse when the subtracted result assumes zero, and an output terminal 1904 for supplying the outpur pulse of the subtractor 1903 to the counter 20 and other circuits. In operation of the decision circuit 19, the number of picture elements included in one scanning line is stored in the register 1902. Since the number of picture elements from the left end of a scanning line including the instant scanning picture element to the instant scanning picture element is applied from the input terminal 1900, the subtractor 1903 generates an output pulse at the output terminal 1904 in response to coincidence of the contents of the registers 1901 and 1902 when the scanning reaches the right most picture element of each scanning line. In operation of the decision circuit 21, the number of spaces of scanning lines is stored in the register 1902 to set the reference information to the predetermined pattern, while the number of scanning lines from a scanning line, to which the reference information is set to the predetermined pattern, is stored in the register 1901. Accordingly, an output pulse is obtained from the subtractor 1903 for the number of scanning lines stored in the register 1902.

Figure 10:
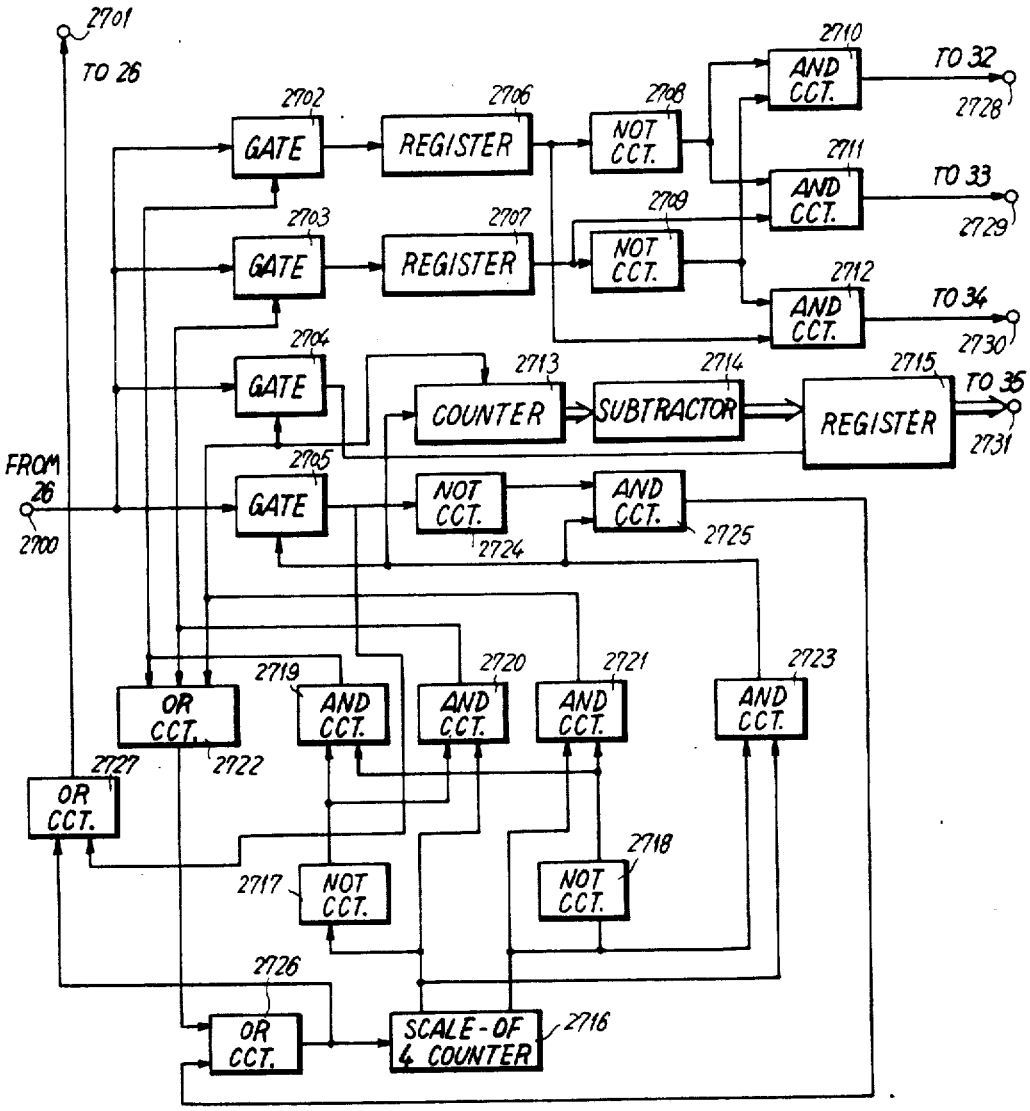
FIG. 10 is a block diagram illustrating an example of a decoder employed in a circuit for reverse conversion of a coded signal of this invention.

With reference to FIG. 10, an example of the encoder 27 shown in FIG. 4 comprises an input terminal 2700 connected to the input information memory 26, an output terminal 2701 connected to the input information memory 26, gates 2702, 2703, 2704 and 2705 for selectively passing the information from the input terminal 2700, registers 2706 and 2707 temporarily storing the respective outputs of the gates 2702 and 2703, NOT circuits 2708 and 2709, AND circuits 2710, 2711 and 2712, a counter 2713 reset to the state "0" by an output pulse of a below mentioned AND circuit 2721 for counting the output pulses of a below mentioned AND circuit 2723, a subtractor 2714 for subtracting by "1" from the counted result of the counter 2713, a register 2715 for storing the outputs of the gate 2704 and the subtractor 2714, a scale-of-4 counter 2716, NOT circuits 2717 and 2718, AND circuits 2719, 2720 and 2721, an OR circuit 2722, an AND circuit 2723, a NOT circuit 2724, an AND circuit 2725, an OR circuit 2726 for providing output pulses applied to the binary counter 2716, an OR circuit 2727, and output terminals 2728, 2729, 2730 and 2731 connected to the circuits 32, 33, 34 and 35 respectively.

In operation, the decoder 27 reads out for one bit the information stored in the input information memory 26 and sends out the variable length code word of the readout information after decoding. In this case, information indicative of which one of [th] *the* picture elements $P_1$, $P_2$ and $P_3$ is the reference information change picture element is sent out through the terminals 2728, 2729 and 2730, while relative distance information of a coded information change picture element with respect to the reference information change picture element. The input code work applied through the input terminal 2700 comprises two initial bits indicative of which one of the information change picture elements $P_1$, $P_2$ and $P_3$ is selected as the reference information change picture element, a next bit indicative of a sign of the coded distance, and a remainder of one bit indicative of the absolute value of the coded distance as shown in Table 3. The scale-of-4 counter 2716 is reset to the state "00" at the initial condition, so that the AND circuit 2719 generates an output pulse by the outputs of the NOT circuit 2717 and 2718 to open the gate 2702 so as to store the input code word from the input terminal 2700 to the register 2706. In this case, since the output pulse of the AND circuit 2719 is applied to the scale-of-4-1 counter 2716 through the OR circuits 2722 and 2726, the contents of the counter 2716 are counted up to the state "01". Moreover, the output pulse of the OR circuit 2726 is applied to the memory 26 through the OR circuit 2727 and the output terminal 2701 to read out one bit from the memory 26, so that the read out one bit is then applied to the input terminal 2700. At this time, since the AND circuit 2720 generates an output, the gate 2703 is opened to pass a second bit of the input code word to the register 2707. As mentioned above, the stored bits in the registers 2706 and 2707 respectively indicate which one of the picture elements $P_1$, $P_2$ and $P_3$ is the reference information change picture element. An output pulse is obtained at the output terminal 2728, 2729 or 2730 through the NOT circuits 2708 and 2709 and the AND circuits 2710, 2711 and 2712 in accordance with the reference picture element of the picture elements $P_1$, $P_2$ and $P_3$ respectively. The output pulse of the AND circuit 2720 is also applied to the counter 2716 through the OR circuit 2722 and 2726 and to the memory 26 as mentioned above. Accordingly, the counter 2716 is counted up to the state "10", while a next bit is read out from the memory 26. In this case, since the gate 2704 is opened by the output pulse of the AND gate 2721, the third bit of the input code word is stored in the register 2715 as the sign of the coded distance. In response to the output pulse of the AND circuit 2721, the counter 2713 is reset to zero, while the counter 2716 is counted up to the state "11". In this case, since the gate 2705 is opened by the output pulse of the AND circuit 2723, the fourth bit of the input code word is applied to the NOT circuit 2724. If the fourth bit is the state "1", since the AND circuit 2725 generates no output pulse, the contents of the counter 2716 are not changed and the opened state of the gate 2705 continues. The output pulse of the AND circuit 2723 is counted by the counter 2713. When the output of the gate 2705 becomes the state "0", since the AND circuit 2725 generates an output pulse, the counter 2716 is counted up to the state "00". In this case, the contents of the counter 2713 which indicates one plus the number of continuous bits "1" of the input code word are applied to the subtractor 2714 to subtract one bit therefrom. Accordingly, the number of continuous bits "1" of the input code word is stored in the register 2715. As mentioned above, decoding of the variable length code words shown in Table 3 is performed. After the resetting of the counter 2716 to the state "00", the above mentioned operations are repeated.

Figure 11:
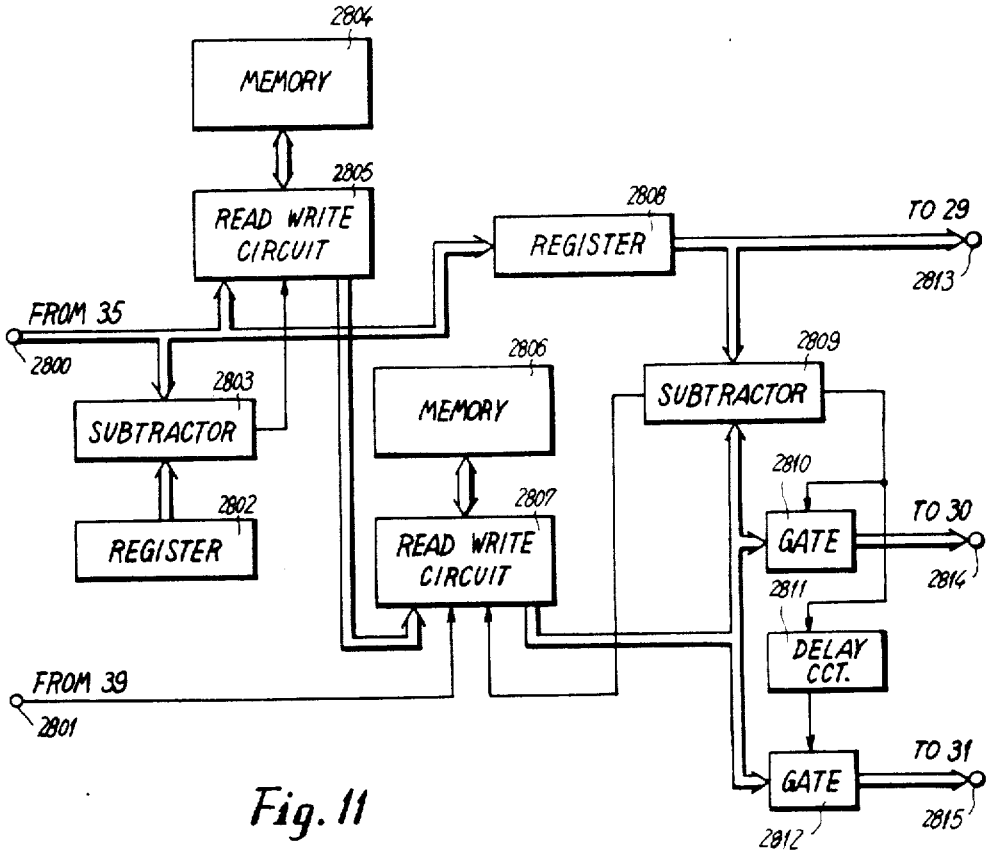
FIG. 11 is a block diagram illustrating an example of a reference information memory employed in a circuit for reverse conversion of a coded signal of this invention.

With reference to FIG. 11, an example of the reference information memory 28 comprises an input terminal 2800 for receiving the output of the restoring circuit 35 which is the absolute address information of the coded information change picture element, an input terminal for receiving the output of the decision circuit 39 which is information indicative of setting of the reference information to a predetermined pattern, a register 2802 for storing a predetermined number corresponding to the number of picture elements included in a scanning line, a subtractor 2803 for subtracting the contents of the register 2802 from the input information of the input terminal 2800 to provide a pulse in response to the zero of the subtracted result thereof. In other words, the subtractor 2803 generates the pulses in response to completion of the decoding of each scanning line. The example further comprises a memory 2804 for storing the absolute address of the information change picture element on the instant scanning line, a read-write circuit 2805 for the memory 2804, a memory 2806 for storing the absolute address of the information change picture element on the reference scanning line, a read-write circuit 2807 for the memory 2806, and a register 2808 for temporarily storing the information of the input terminal 2800. A subtractor 2809 is provided for subtracting the absolute address of the information change picture element in the memory 2806 from the contents of the register 2808. If the subtracted result is minus or zero, the subtractor 2809 sends our a pulse to the read write circuit 2807 to read out the absolute address of a next information change picture element. The above operations are repeated until a pulse subtracted result is obtained. In case of obtaining the plus subtracted result from the subtractor 2809, a next information change picture element is once more read out from the memory 2806. The example moreover comprises a gate 2810, a delay circuit 2811, a gate 2812, and output terminals 2813, 2814 and 2815 for respectively connected to the registers 29, 30 and 31.

In operation, absolute address information of a decoded information change picture element is applied from the input terminal 2800 and stored in the memory 2804 and the register 2808. If this information change picture element is the right most picture element, this right most picture element is detected by the subtractor 2803 so that the contents of the memory 2804 are transferred to the memory 2806 to be ready for decoding a next scanning line. When a pulse is applied to the input terminal at this time, the contents of the memory 2806 are set to a predetermined pattern as shown in FIG. 2. the absolute address information of an information change picture element stored in the register 2808 becomes a reference information change picture element ($P_1$ in FIG. 1) employed at the decoding of a next information change picture element and is then send out to the output terminal [3813] *2813*. Other reference information change picture elements ($P_2$, $P_3$ in FIG. 1) are read out from the memory 2806 as described below. If the absolute address of an information change picture element of the memory 2806 is read out, the read out absolute address is compared with the contents ($P_1$ in FIG. 1) of the register 2808 at the subtractor 2809. If the contents of the register 2808 are larger than the read out absolute address in a case where the picture element $P_1$ is positioned at the right hand of the information change picture element, the absolute address of a next information change picture element is read out. After repeating the above operations, if the read out absolute address from the memory 2806 is larger than the contents of the register 2808, this information change picture element becomes a second reference picture element ($P_2$ in FIG. 1) so that a pulse is applied to the gate 2810 to send out the absolute address to the output terminal 2814. In this case, the absolute address of a next information change picture element is further read out from the memory 2806 and sent out, through the gate 2812, to the output terminal 2815 as a third reference information change picture element ($P_3$ in FIG. 1).

Figure 12:
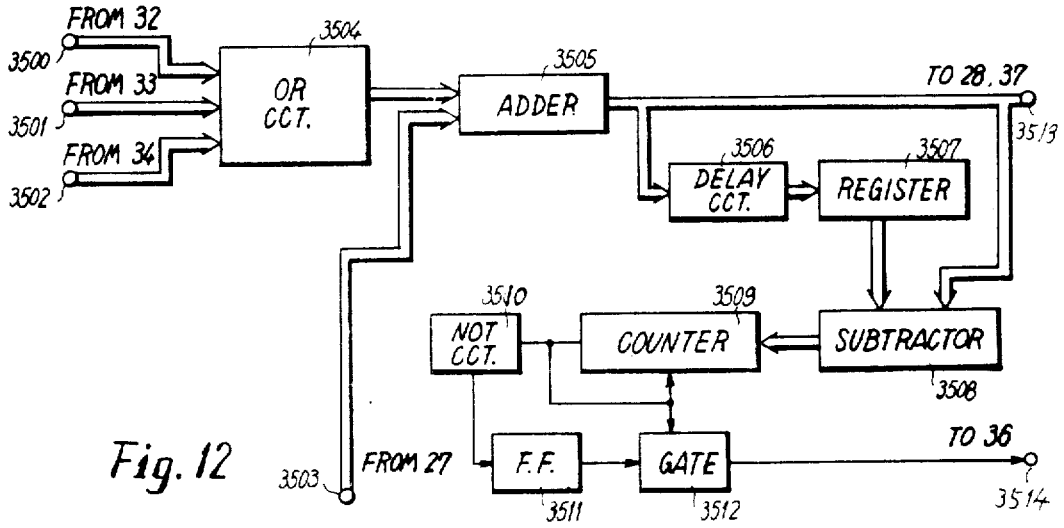
FIG. 12 is a block diagram illustrating an example of a restoring circuit employed in a circuit for reverse conversion of a coded signal of this invention.

With reference to FIG. 12, an example of the restoring circuit 35 comprises input terminals 3500, 3501 and 3502 for respectively receiving the outputs of the gates 32, 33 and 34, an input terminal 3503 for receiving the output of the decoder 27, an OR circuit 3504, and adder 3505, a delay circuit 3506, and a register 3507, a subtractor 3508 for subtracting the contents of the register 3507 from the adder 3505. A counter 3509 is initially set to the output value of the subtractor 3508 and generates one pulse when the set value is not zero. The one pulse reduces the counting state of the counter 3509 by one. The example further comprises a NOT circuit 3510, a flip flop circuit 3511 reversing its state for each input pulse thereof, a gate 3512, an output terminal connected to the reference information memory 28 and the error detector 37, and an output terminal connected to the output terminal memory 36.

In operation, since the input terminals 3500, 3501 and 3502 receive respective outputs of the gates 32, 33 and 34, the output of the OR circuit 3504 becomes the absolute address of the reference information change picture element. On the other hand, the coded distance information is applied through the input terminal 3503, so that the output of the adder 3505 becomes the absolute address of the decoded information change picture element. This information picture element becomes a reference information change picture element at the decoding of a next information picture element and is sent out through the output terminal 3513 to the reference information memory 28 and then to the subtractor 3508 and the delay circuit 3506. Since the absolute address of an information change picture element immediately preceding the information change picture element obtained at the adder 3505 is stored in the register 3507, the subtracted result of the subtractor 3508 becomes a distance between the questioned information change picture elements, that is, a run length, which is set to the counter 3509. This counter 3509 generates one pulse at the counting states except the zero state and counts down by one in response to the one pulse. The gage 3512 is opened by the one pulse, so that the output value of the flip flop circuit 3511 is sent out to the output terminal 3514 by a number equal to the run length. When the counting state of the counter 3509 assumes zero, the output pulse of the counter 3519 is stopped so that the output value of the flip flop circuit 3511 is reversed. Accordingly, the output value of the flip flop circuit 3511 assumes that state "1" and "0" in response to black and white of the run, respectively.

Figure 13:
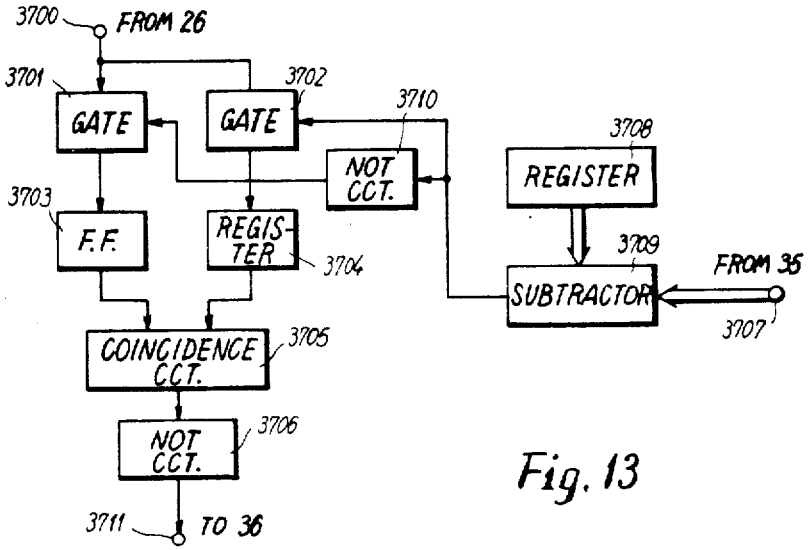
FIG. 13 is a block diagram illustrating an example of an error detector employed in a circuit for reverse conversion of a coded signal of this invention.

With reference to FIG. 13, an example of the error detector 37 comprises an input terminal 3700 connected to the output of the input information memory 26, gates 3701 and 3702, a flip flop circuit 3703, a register 3704, a coincidence circuit 3705 for generating a pulse in a case where the state of the flip flop circuit 3703 coindides with the contents of the register 3704, a NOT circuit 3706, an input terminal 3707 connected to the output of the restoring circuit 35, a register 3708 for storing a predetermined number corresponding to the number of picture element on each scanning line, a subtractor 3709 for generating a pulse in response to its zero state by subtracting the information of the input terminal 3707 from the contents of the register 3708, a NOT circuit 3710, and an output for sending out a pulse in case of detecting an error.

In operation, this error detector 37 performs parity check (i.e. odd parity). In this case, it is assumed that an error detecting bit is added to the last code word of each scanning line. The absolute address of a decoded information change picture element applied through the input terminal 3700 is subtracted at the subtractor 3709 from the contents of the register 3709, so that a pulse is obtained from the subtractor 3709 at the completion of decoding of each scanning line information. In response to this pulse, the gate 3702 is opened so that the parity check bit included in the input code word is stored in the register 3704. On the other hand, the remainder of the input code word other than the parity check bit is applied to the flip flop circuit 3703 through a gate 3701, so that the flip flop circuit 3703 counts the number of "1" in the input code word. In a case where the contents of the register 3704 coincides with the state of the flip flop circuit 3703 at the completion of the decoding of each scanning line, no error is decided so that the coincidence circuit 3704 generates a pulse while no pulse is obtained at the output terminal 3711. If the contents of the flip flop circuit 3703 and the register 3704 do not coincide with each other, a pulse indicative of error detection is obtained at the output terminal 3711.

As has been described in detail in the foregoing, the method of this invention is proposed under a principle in that the address information of each information change picture element is encoded by encoding the distance between the information change picture element and that considered to have the closest correlation to the former. The distribution of this distance is over one-sided to 0 and $\pm 1$ in practice, so that this information has a very small amount of information. Accordingly, this invention greatly reduces the number of bits to be sent out and enables marked reduction of the band with respect to the band-time integral, and hence can be practised with; such relatively simple circuitry as shown in the examples.

What we claim is:

[1. A system for coding information change picture elements in a facsimile signal, comprising:

input terminal means for receiving the facsimile signal;

first encoder means connected to said input terminal means for encoding the absolute address of each information change picture element, having a state different from that of an immediately preceding picture element on each scanning line, in the facsimile signal in such a manner that a distance between the information change picture element and a reference information change picture element selected from information change picture elements of at least an immediately preceding scanning line is encoded by a minimum number of bits of each code word in the order of occurrence of all the information change picture elements;

detector means connected to said input terminal means for generating a detection output signal when no information change picture element is included in an instant scanning line of the facsimile signal;

second encoder means connected to said input terminal means and said detector means for encoding the run length of the scanning line of the facsimile signal in response to said detection output signal; and output means connected to said first encoder means and said second encoder means for obtaining a coded output pulse train from outputs of said first encoder means and said second encoder means.]

[2. A system for coding information change picture elements in a facsimile signal comprising:

input terminal means for receiving the facsimile signal;

first encoder means connected to said input terminal means for encoding the absolute address of each information change picture element, having a state different from that of an immediately preceding picture element on each scanning line, in the facsimile signal in such a manner that a distance between each information change picture element and a reference information change picture element selected from information change picture elements of at least an immediately preceding scanning line is encoded by a minimum number of bits of each code word in the order of occurrence of all the information change picture elements, said first encoder means comprising first reference means for selecting, as a first reference information change picture element, an information change picture element immediately preceding an instant information change picture element to be coded on the same scanning line as the instant information change picture element, second reference means for selecting, as a second reference information change picture element, a first information change picture element having the same information change direction as the instant information change picture element and positioned to the right of said first reference information change picture element on a scanning line immediately preceding the instant scanning line, reference detection means connected to said first reference means and said second reference means for providing a final reference information change picture element by selecting a nearer one of the first reference information change picture element and the second reference information change picture element to the instant information change picture element to be coded, and encoder means for encoding the number of picture elements from said final reference information change picture element to the instant information change picture element to be coded;

detector means connected to said input terminal means for generating a detection output signal when no information change picture element is included in an instant scanning line of the facsimile signal;

second encoder means connected to said input terminal means and said detector means for encoding the run length of the scanning line of the facsimile signal in response to said detection output signal; and output means connected to said first encoder means and said second encoder means for obtaining a coded output pulse train from outputs of said first encoder means and said second encoder means.]

[3. A system for coding information change picture elements in a facsimile signal comprising:

input terminal means for receiving the facsimile signal;

first encoder means connected to said input terminal means for encoding the absolute address of each information change picture element, having a state different from that of an immediately preceding picture element on each scanning line, in the facsimile signal in such a manner that a distance between each information change picture element and a reference information change picture element selected from information change picture elements of at least an immediately preceding scanning line is encoded by a minimum number of bits of each code word in the order of occurrence of all the information change picture elements;

detector means connected to said input terminal means for generating a detection output signal when no information change picture element is included in an instant scanning line of the facsimile signal;

second encoder means connected to said input terminal means and said detector means for encoding the run length of the scanning line of the facsimilie signal in response to said detection output signal;

gate means connected to said input terminal means, first encoder means and said second encoder means for forcibly gating the facsimile signal to said second encoder means for every predetermined number of scanning lines; and output means connected to said first encoder means and said second encoder means for obtaining a coded output pulse train from outputs of said first encoder means and said second encoder means.]

[4. A system for encoding information change picture elements in a facsimile signal comprising:

input terminal means for receiving the facsimile signal;

first encoder means connected to said input terminal means for encoding the absolute address of each information change picture element, having a state different from that of an immediately preceding picture element on each scanning line, in the facsimile signal in such a manner that a distance between each information change picture element and a reference information change picture element selected from information change picture elements of at least an immediately preceding scanning line is encoded by a minimum number of bits of each code word in the order of occurrence of all the information change picture elements; said first encoder means comprising, first reference means for selecting, as a first reference information change picture element, an information change picture element immediately preceding an instant information change picture element to be coded on the same scanning line as the instant information change picture element, second reference means for selecting, as a second reference information change picture element, a first information change picture element positioned to the right of said first reference information change picture element on a scanning line immediately preceding the instant scanning line, third reference means for selecting, as a third reference information change picture element, a first information change picture element position to the right of said second reference information change picture element on a scanning line immediately preceding the instant scanning line, reference detection means connected to said first reference means, said second reference means and said third reference means for providing a final reference information change picture element by selecting a nearer one of the first reference information picture element and the second information picture element to the instant information change picture element to be coded in a case where a reference distance between the first reference picture element and the second reference picture element is greater than a predetermined value or by selecting a nearer one of the first reference information picture element and the third reference picture element ot the instant information change picture element in a case where said reference distance is smaller than said predetermined value, and encoder means for encoding the number of picture elements from said final reference information change picture element to the instant information change picture element;

detector means connected to said input terminal means for generating a detection output signal when no information change picture element is included in an instant line of the facsimile signal;

second encoder means connected to said output terminal means and said detector means for encoding the run length of the scanning line of the facsimile signal in response to said detection output signal; and output means connected to said first encoder means and said second encoder means for obtaining a coded output pulse train from outputs of said first encoder means and said second encoder means.]

[5. A system for coding information change picture elements in a facsimile signal according to claim 4, further comprising: gate means connected to said input teminal means, first encoder means and said second encoder means for forcibly gating the facsimile signal to said second encoder means for every predetermined number of scanning lines.]

[6. A system for coding information change picture elements in a facsimile signal according to claim 2, further comprising: gate means connected to said input terminal means, first encoder means and said second encoder means for forcibly gating the facsimile signal to said second encoder means for every predetermined number of scanning lines.]

*7. A system for coding information change picture elements in a facsimile signal, comprising:*

*input terminal means for receiving the facsimile signal;*

*encoder means connected to said input terminal means for encoding the absolute address of each information change picture element, having a state different from that of an immediately preceding picture element on each scanning line, in the facsimile signal in such a manner that a distance between the information change picture element and a reference information change picture element selected from information change picture elements of an immediately preceding scanning line and the scanning line to be coded is encoded by a minimum number of bits of each code word in the order of occurrence of all the information change picture elements; and*

*output means connected to said encoder means for obtaining a coded output pulse train from the output of said encoder means.*

*8. A system for coding information change picture elements in a facsimile signal comprising:*

*input terminal means for receiving the facsimile signal;*

*encoder means connected to said input terminal means for encoding the absolute address of each information change picture element, having a state different from that of an immediately preceding picture element on each scanning line, in the facsimile signal in such a manner that a distance between each information change picture element and a reference information change picture element selected from information change picture elements of an immediately preceding scanning line and the scanning line to be coded is encoded by a minimum number of bits of each code word in the order of occurrence of all the information change picture elements, said encoder means comprising first reference means for selecting, as a first reference information change picture element, an information change picture element immediately preceding an instant information change picture element to be coded on the same scanning line as the instant information change picture element, second reference means for selecting, as a second reference information change picture element, a first information change picture element having the same information change direction as the instant information change picture element and positioned to the right of said first reference information change picture element on a scanning line immediately preceding the instant scanning line, reference detection means connected to said first reference means and said second reference means for providing a final reference information change picture element by selecting a nearer one of the first reference information change picture element and the second reference information change picture element to the instant information change picture element to be coded, and means for encoding the number of picture elements from said final reference information change picture element to the instant information change picture element to be coded; and*

*output means connected to said encoder means for obtaining a coded output pulse train from the output of said encoder means.*

*9. A system for coding information change picture elements in a facsimile signal comprising:*

*input terminal means for receiving the facsimile signal;*

*first encoder means connected to said input terminal means for encoding the absolute address of each information change picture element, having a state different from that of an immediately preceding picture element on each scanning line, in the facsimile signal in such a manner that a distance between each information change picture element and a reference information change picture element selected from informa-*

*tion change picture elements of an immediately preceding scanning line and the scanning line to be coded is encoded by a minimum number of bits of each code word in the order of occurrence of all the information change picture elements;*

*second encoder means connected to said input terminal means for encoding each run length of the scanning line of the facsimile signal;*

*gate means connected to said input terminal means, first encoder means and said second encoder means for forcibly gating the facsimile signal to said second encoder means for every predetermined number of scanning lines; and*

*output means connected to said first encoder means and said second encoder means of obtaining a coded output pulse train from outputs of said first encoder means and said second encoder means.*

*10. A system for encoding information change picture elements in a facsimile signal comprising;*

*input terminal means for receiving the facsimile signal;*

*encoder means connected to said input terminal means for encoding the absolute address of each information change picture element, having a state different from that of an immediately preceding picture element on each scanning line, in the facsimile signal in such a manner that a distance between each information change picture element and a reference information change picture element selected from information change picture elements of an immediately preceding scanning line and the scanning line to be coded is encoded by a minimum number of bits of each code word in the order of occurrence of all the information change picture elements; said encoder means comprising, first reference means for selecting, as a first reference information change picture element, an information change picture element immediately preceding an instant information change picture element to be coded on the same scanning line as the instant information change picture element, second reference means for selecting, as a second reference information change picture element, a first information change picture element positioned to the right of said first reference information change picture element on a scanning line immediately preceding the instant scanning line, third reference means for selecting, as a third reference information change picture element, a first information change picture element positioned to the right of said second reference information change picture element on a scanning line immediately preceding the instant scanning line, reference detection means connected to said first reference means, said second reference means and said third reference means for providing a final reference information change picture element by selecting a nearer one of the first reference information picture element and the second information picture element to the instant information change picture element to be coded in a case where a reference distance between the first reference picture element and the second reference picture element is greater than a predetermined value or by selecting a nearer one of the first reference information picture element and the third reference picture element of the instant information change picture element in a case where said reference distance is smaller than said predetermined value, and means for encoding the number of picture elements from said final reference information change picture element to the instant information change picture element; and*

*output means connected to said encoder means for obtaining a coded output pulse train from the output of said encoder means.*

*11. A system for coding information change picture elements in a facsimile signal according to claim 10, further comprising: auxiliary encoder means connected to said input terminal means for encoding each run length on the scanning line of the facsimile signal; and*

*gate means connected to said input terminal means, said encoder means and said auxiliary encoder means for forcibly gating the facsimile signal to said auxiliary encoder means for every predetermined number of scanning lines.*

*12. A system for coding information change picture elements in a facsimile signal according to claim 8, further comprising:*

*auxiliary encoder means connected to said input terminal means for encoding each run length on the scanning line of the facsimile signal; and*

*gate means connected to said input terminal means, said encoder means and said auxiliary encoder means for forcibly gating the facsimile signal to said auxiliary encoder means for every predetermined number of scanning lines.*

* * * * *